(12) United States Patent
Baek

(10) Patent No.: US 7,903,602 B2
(45) Date of Patent: Mar. 8, 2011

(54) METHOD OF SETTING UP PS CALL IN MOBILE COMMUNICATION SYSTEM

(75) Inventor: Young Hyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 11/588,253

(22) Filed: Oct. 27, 2006

(65) Prior Publication Data

US 2007/0097988 A1    May 3, 2007

(30) Foreign Application Priority Data

Oct. 27, 2005    (KR) .................. 10-2005-0101825

(51) Int. Cl.
*H04L 12/66* (2006.01)

(52) U.S. Cl. .................. 370/328; 370/352

(58) Field of Classification Search .......... 455/436, 455/461, 442, 455, 403, 433, 445; 370/352, 370/395.52; 709/245, 246; 379/220.01
See application file for complete search history.

(56) References Cited

U.S. PATENT DOCUMENTS

| | | | | |
|---|---|---|---|---|
| 6,147,986 A | * | 11/2000 | Orsic | 370/349 |
| 6,718,030 B1 | * | 4/2004 | Turner et al. | 379/221.02 |
| 6,839,421 B2 | * | 1/2005 | Ferraro Esparza et al. | 379/220.01 |
| 7,028,084 B1 | | 4/2006 | Horton | |
| 2002/0072367 A1 | * | 6/2002 | Osafune et al. | 455/433 |
| 2002/0080819 A1 | * | 6/2002 | Tsao | 370/469 |
| 2003/0108030 A1 | * | 6/2003 | Gao | 370/351 |
| 2006/0068795 A1 | * | 3/2006 | Caspi et al. | 455/445 |

FOREIGN PATENT DOCUMENTS

| | | |
|---|---|---|
| CN | 1579108 A | 2/2005 |
| KR | 10-2003-0037447 A | 5/2003 |
| KR | 10-2003-0079839 A | 10/2003 |
| KR | 102003-20650 A | 5/2007 |
| KR | 102003-37447 A | 5/2007 |

OTHER PUBLICATIONS

"Digital Cellular Telecommunications Systems (Phase 2+)", ETSI Standards, European Telecommunications Standards Institute, Sophia-Antipo, (France), vol. 3-SA2; SMG3, No. V631; Apr. 1999.

* cited by examiner

*Primary Examiner* — George Eng
*Assistant Examiner* — Nizar Sivji
(74) *Attorney, Agent, or Firm* — Birch, Stewart, Kolasch & Birch, LLP

(57) ABSTRACT

A method of setting up a PS call in a mobile communication system is disclosed, by which a resource waste of a PS call can be reduced. In a mobile communication terminal which sets up a PS call connection to a PS network, an embodiment of the present invention includes the step of deciding whether to maintain the PS call connection according to whether the mobile communication terminal is able to access a domain name system server for the PS network.

7 Claims, 2 Drawing Sheets

METHOD OF SETTING UP PS CALL IN MOBILE COMMUNICATION SYSTEM

This application claims the benefit of the Korean Patent Application No. P10-2005-0101825, filed on Oct. 27, 2005, which is hereby incorporated by reference as if fully set forth herein.

BACKGROUND OF THE INVENTION

1. Field of the Invention

The present invention relates to a mobile communication, and more particularly, to a method of setting up a PS call in a mobile communication system. Although the present invention is suitable for a wide scope of applications, it is particularly suitable for setting up a PS (packet switched) call for a packet switched data service in a mobile communication system.

2. Discussion of the Related Art

Generally, the remarkable development of an information communication field brings about rapid changes of information and communication environments. And, a mobile communication terminal is globally used and regarded as a living necessary in the modern society. To cope with the user's demand according to the global use of the mobile communication terminal, an Internet access function is added to the mobile communication terminal having a general voice communication function.

In a $2^{nd}$ generation or higher mobile communication network that supports a packet switched data service, it is possible for a mobile communication terminal to access the Internet via the mobile communication network.

A process that a mobile communication terminal accesses the Internet via a mobile communication network according to a related art is explained in brief as follows.

First of all, a mobile communication terminal makes a request for a PS call connection to a packet switched data service network.

If the PS call connection request is accepted by the packet switched data service network, the PS call connection is established between the mobile communication terminal and the packet switched data service network. After the PS call connection is established, the mobile communication terminal then receives an IP address of a DNS server responsible for the packet switched data service network from the packet switched data service network.

However, if an incorrect IP address is transmitted to the mobile communication terminal due to an error of a noise on a radio transmission or if the DNS server is operating erroneously, the mobile communication terminal may be unable to access the DNS server despite the established PS call.

Thus, despite the established PS call for an Internet access, the mobile communication terminal is unable to access the DNS server and the Internet access is not achieved. Hence, the established PS call becomes a waste of resource.

SUMMARY OF THE INVENTION

Accordingly, the present invention is directed to a method of setting up a PS call in a mobile communication system that substantially obviates one or more problems due to limitations and disadvantages of the related art.

An object of the present invention is to provide a method of setting up a PS call in a mobile communication system, by which a resource waste of a PS call can be reduced in case that a mobile communication terminal is unable to access a DNS server due to some reason despite the PS call established for an Internet access.

Another object of the present invention is to provide a mobile terminal and a communication system for efficient Internet access.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of setting up a PS call connection to a PS network by a mobile communication terminal according to one aspect of the present invention includes the step of, when the mobile communication terminal is PS call-connected to the PS network, deciding whether to maintain the PS call connection according to whether the mobile communication terminal is able to access a domain name system (DNS) server for the PS network.

Preferably, the method can include: attempting the PS call connection, receiving DNS (domain name system) server information from the PS network when the PS call connection is established, deciding validity of the DNS server information, and releasing the PS call connection if the DNS server information is not valid.

In another aspect of the present invention, a mobile communication terminal includes an RF communication module to set up a PS call connection to a PS network and a controller to control the RF communication module, wherein the controller decides whether to maintain the PS call connection of the RF communication module according to whether the RF communication module is able to access a domain name system server for the PS network when the PS call connection is set up.

In a further aspect of the present invention, a mobile communication system includes a mobile communication terminal, a PS data service supporting node for the mobile communication terminal, and a DNS server for the PS data service supporting node, wherein the mobile communication terminal decides whether to maintain a PS call connection according to whether the mobile communication terminal is able to access the DNS server when a PS call is connected to the PS data service supporting node.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, the present invention is applicable to CDMA series, GSM (GPRS) series, $2^{nd}$ generation, $2.5^{th}$ generation, $3^{rd}$ generation, $3.5^{th}$ generation, $4^{th}$ generation communication networks and the like if a packet switched data service is available. Hence, the scope of the present invention is not limited to the following description which describes the examples of the present invention.

Figure 1:
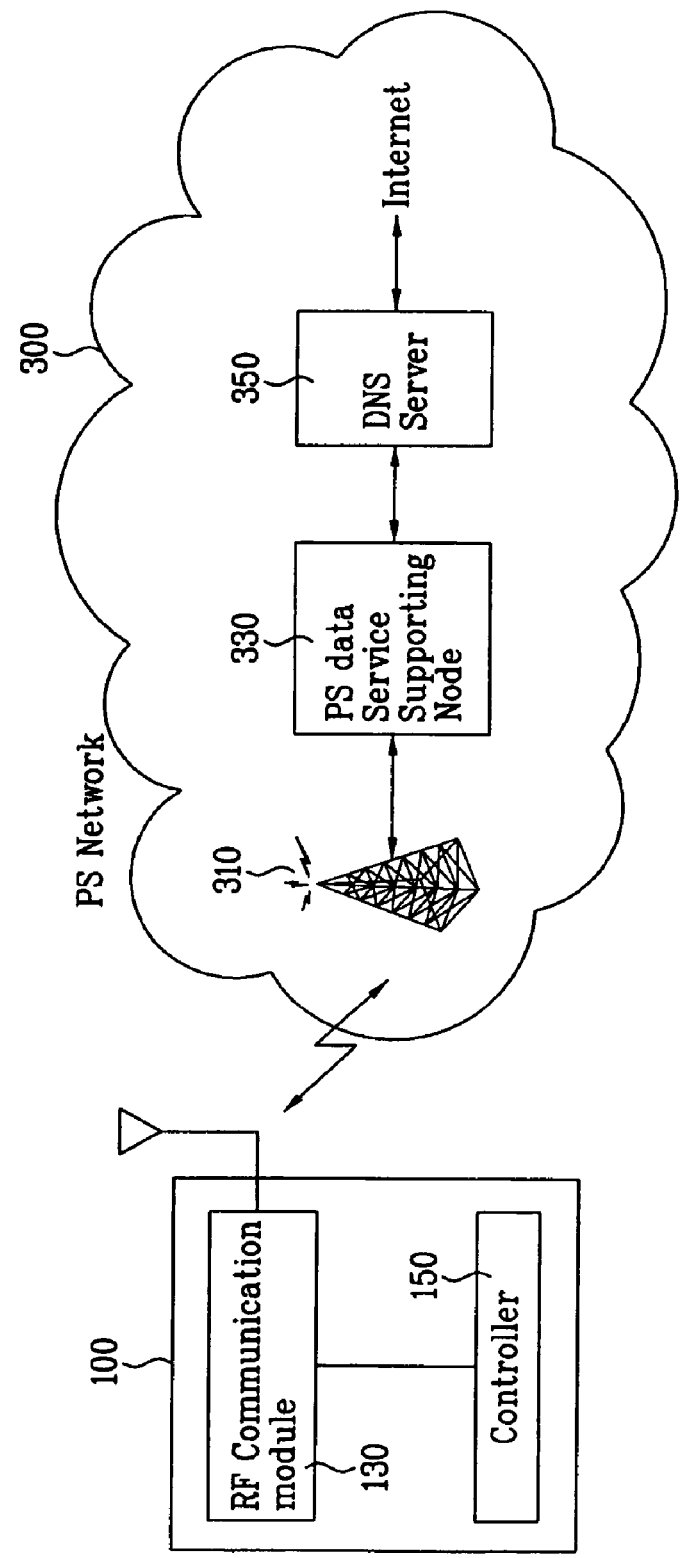
FIG. 1 is a schematic block diagram of a mobile communication system according to one embodiment of the present invention.

FIG. 1 is a schematic block diagram of a mobile communication system according to one embodiment of the present invention.

Referring to FIG. 1, a mobile communication system according to one embodiment of the present invention includes a mobile communication terminal 100 and a PS network 300, all operatively configured and coupled.

The mobile communication terminal 100 includes an RF communication module 130 and a controller 150. It is a matter of course that the mobile communication terminal 100 according to the present invention further includes other additional elements such as a key input module (not shown in the drawing), a display module (not shown in the drawing), a memory module (not shown in the drawing) and the like. Since the additional elements are not directly associated with the present invention, explanations for the additional elements will be omitted in the following description for the convenience of explanation of the present invention.

The RF communication module 130 enables the mobile communication terminal 100 to perform mobile communications externally. In particular, the RF communication module 130 enables the mobile communication terminal 100 to perform packet switched data communications.

And, the controller 150 plays a role of controlling the overall terminal 100 including the RF communication module 130. In particular, the controller 150 enables the mobile communication terminal 100 to implement a PS call setup method according to the present invention that will be explained later.

Meanwhile, the PS network 300 of the mobile communication system according to the present invention includes a base station 310, a PS data service supporting node 330 and a DNS (domain name system) server 350.

The base station 310 plays a role in relaying radio communications between the mobile communication terminal 100 and the PS data service supporting node 330.

The PS data service supporting node 330 is a node responsible for a data packet transport between the mobile communication terminal 100 and the PS network 300.

In GPRS (general packet radio service) system, SGSN (serving GPRS support node) plays a role of the PS data service supporting node 330. In CDMA system, PDSN (packet data serving node) plays a role of the PS data service supporting node 330.

So, any node responsible for a packet transfer between a mobile communication terminal and a network can be regarded as the PS data service supporting node 330 regardless of its name in various mobile communication series and communication generations.

The DNS (domain name system) server 350 plays a role in converting a host or domain name on the Internet (or other network) to an IP address. If a user knows a specific host or domain name, the DNS server 350 enables the specific host or domain to be accessed even if the user does not know an IP address of the specific host or domain. Hence, the DNS server 350 facilitates the user to use the Internet (or other network).

A method of setting up a PS call in the above-configured mobile communication system according to an embodiment of the present invention is explained with reference to FIG. 2 as follows.

Figure 2:
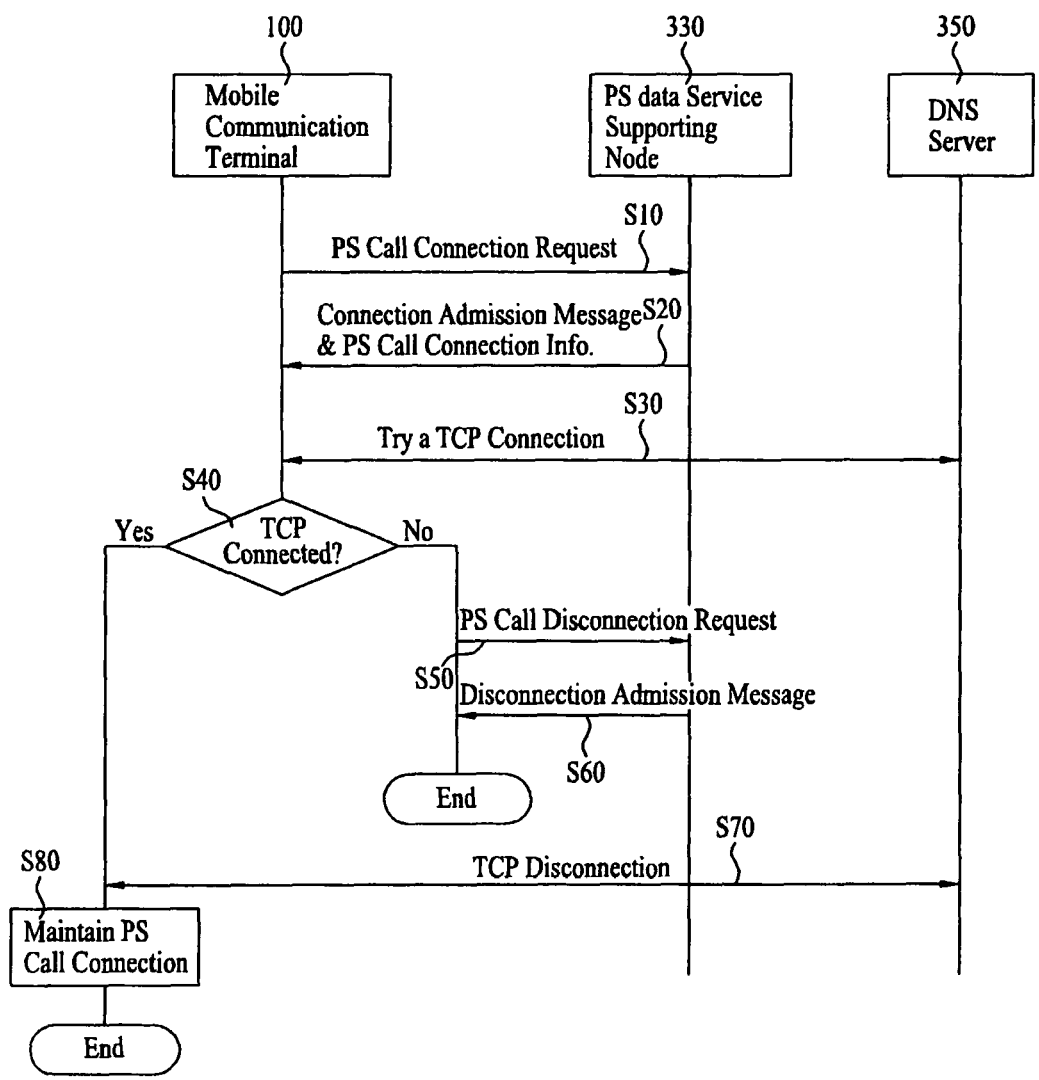
FIG. 2 is a flowchart of a method of setting up a PS call in a mobile communication system according to the present invention.

FIG. 2 is a flowchart of a method of setting up a PS call in a mobile communication system according to an embodiment of the present invention. This method is implemented in the system of FIG. 1, but can be implemented in other suitable systems.

Referring to FIG. 2, the mobile communication terminal 100 makes a request for a PS call connection to the PS data service supporting node 330. [S10]

The PS data service supporting node 330 then sends a connection admission message and PS call connection information to the mobile communication terminal 100 in response to the request. [S20]

In this case, the PS call connection information includes an IP address of the mobile communication terminal 100, and information of the DNS server (DNS server information) responsible for the PS data service supporting node 330. The DNS server information includes an IP address of the DNS server.

Subsequently, the mobile communication terminal 100 attempts a connection to the DNS server using the IP address of the DNS server provided in the received DNS service information. [S30] In particular, the mobile communication terminal 100 preferably attempts a TCP (transmission control protocol) connection to 53-port among several ports of the DNS server.

Yet, an incorrect IP address of the DNS server may have been transmitted to the mobile communication terminal 100 at step S20 due to an error such as a nose on a transmission or the DNS server may have been malfunctioning. So, the TCP connection may fail.

If the TCP connection with the DNS server 350 fails at step S40, the mobile communication terminal 100 determines that the received DNS server information (e.g., the IP address of the DNS server) is not valid due to the TCP connection failure and makes an immediate request for a PS call disconnection to the PS data service supporting node 330. [S40, S50]

The PS data service supporting node 330 then transmits a message of admitting the PS call disconnection to the mobile communication terminal 100 in response to the request. So, the PS call connection is released upon direct request. [S60]

Meanwhile, if the TCP connection succeeds at step S40, the mobile communication terminal 100 maintains the PS call connection. If necessary, the mobile communication terminal 100 can maintain the PS call connection after releasing the TCP connection to the DNS server. [S40, S70, S80]

Accordingly, the present invention is advantageous in effectively reducing a PS call resource waste that may be generated in case that a mobile communication terminal having a PS call connection for an Internet access is unable to access a DNS server due to some reason. The present invention makes a determination on the validity of the DNS service information and forcibly disconnects the PS call if the DNS server information is not valid.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of setting up a packet switched (PS) call connection to a PS network by a mobile communication terminal, the method comprising:
    attempting the PS call connection;
    establishing the PS call connection and receiving DNS server information from the PS network;
    attempting a connection to a domain name system (DNS) server using the received DNS server information after the mobile communication terminal is PS call-connected to the PS network;
    deciding by the mobile communication terminal a validity of the DNS server information based on whether the mobile communication terminal is able to access the DNS server for the PS network;
    maintaining the PS call connection if the DNS server information is decided to be valid; and
    releasing the PS call connection based on a request for a PS call disconnection if the DNS server information is decided to be not valid,
    wherein the request for a PS call disconnection is from the mobile communication terminal to the PS network,
    the DNS server information includes an IP address of the DNS server,
    the validity deciding step includes:
        enabling the mobile communication terminal to attempt the connection to the DNS server using the IP address; and
        determining that the DNS server information is valid if the connection to the DNS server succeeds or invalid if the connection to the DNS server fails,
    in the enabling step, the mobile communication terminal attempts a transmission control protocol (TCP) connection to a $53^{rd}$ port of the DNS server, and
    the method further comprising releasing the TCP connection if the mobile communication terminal succeeds in the TCP connection.

2. A mobile communication terminal, comprising:
    an RF communication module to set up a packet switched (PS) call connection to a PS network; and
    a controller to control the RF communication module,
    wherein the controller controls the RF communication module to attempt the PS call connection, establishes the PS call connection and receives DNS server information from the PS network, attempts a connection to a domain name system (DNS) server using the received DNS server information after the mobile communication terminal is PS call-connected to the PS network, decides a validity of the DNS server information based on whether the RF communication module is able to access the DNS server for the PS network, maintains the PS call connection if the DNS server information is decided to be valid, and releases the PS call connection based on a request for a PS call disconnection if the DNS server information is decided to be not valid,
    wherein the request for a PS call disconnection is from the mobile communication terminal to the PS network,
    the DNS server information includes an IP address of the DNS server,
    the controller controls the RF communication module to attempt a connection to the DNS server using the IP address, and decides that the DNS server information is valid if the connection to the DNS server succeeds or invalid if the connection to the DNS server fails,
    the RF communication module attempts a transmission control protocol (TCP) connection to a $53^{rd}$ port of the DNS server, and
    the controller controls the RF communication module to release the TCP connection if the mobile communication terminal succeeds in the TCP connection.

3. A mobile communication system, comprising:
    a mobile communication terminal;
    a packet switched (PS) data service supporting node for the mobile communication terminal; and
    a domain name system (DNS) server for the PS data service supporting node,
    wherein the mobile communication terminal attempts the PS call connection to the PS data service supporting node, establishes the PS call connection and receives information of the DNS server from the PS data service supporting node, attempts a connection to the DNS server using the received information of the DNS server after the mobile communication terminal is PS call-connected to the PS data service supporting node, decides a validity of the information of the DNS server based on whether the mobile communication terminal is able to access the DNS server, maintains the PS call connection if the information of the DNS server is decided to be valid, and releases the PS call connection based on a request for a PS call disconnection if the information of the DNS server is decided to be not valid,
    wherein the request for a PS call disconnection is from the mobile communication terminal to the PS data service supporting node,
    the information of the DNS server includes an IP address of the DNS server,
    the mobile communication terminal attempts the connection to the DNS server using the IP address and decides that the information of the DNS server is valid if the connection to the DNS server succeeds or invalid if the connection to the DNS server fails,
    the mobile communication terminal attempts a transmission control protocol (TCP) connection to a $53^{rd}$ port of the DNS server, and
    the mobile communication terminal releases the TCP connection if the TCP connection is successful.

4. The mobile communication system of claim 3, wherein the PS data service supporting node is a SGSN (Service GPRS (General Packet Radio Service) Support Node) or a PDSN (Packet Data Serving Node).

5. The method of claim 1, wherein the mobile communication terminal decides whether to maintain the PS call connection according to whether the mobile communication terminal is able to access the domain name system (DNS) server for the PS network using the IP address of the DNS server.

6. The mobile communication terminal of claim 2, wherein the controller decides whether to maintain the PS call connection of the RF communication module according to whether the RF communication module is able to access the DNS server for the PS network using the IP address of the DNS server.

7. The mobile communication system of claim 3, wherein the mobile communication terminal decides whether to maintain the PS call connection according to whether the mobile communication terminal is able to access the DNS server for a PS network using the IP address of the DNS server.

* * * * *